UNITED STATES PATENT OFFICE.

JESSE P. BATTERSHALL, OF NEW YORK, N. Y.

ART OF EXTRACTING GLYCERINE FROM THE WASTE SOAP-LIQUOR OF SOAP-MANUFACTURE.

SPECIFICATION forming part of Letters Patent No. 276,551, dated May 1, 1883.

Application filed February 14, 1883. (No specimens.)

*To all whom it may concern:*

Be it known that I, JESSE PARK BATTERSHALL, chemist, of the city and county of New York, in the State of New York, have invented certain new and useful Improvements in the Art of Extracting Glycerine from the Waste Soap-Liquor of Soap-Manufacture, of which the following is a true specification.

My process consists in submitting soap-makers' mother-lye to a series of treatments, by means of which the impurities contained therein are eliminated to such an extent as to render the resulting product of practical value for use in the mechanical arts.

A hitherto insurmountable obstacle to the success of all previous processes for treating waste soap-lye for the purpose of extracting glycerine therefrom has been the difficulty experienced in removing the saline compounds contained therein.

In carrying out my invention the free and carbonated alkalies contained in the waste soap-liquor are either directly neutralized by the addition of sulphuric acid, as hitherto practiced, or the liquor is first reduced by evaporation to, say, three-quarters ($\frac{3}{4}$) of its original volume, and the neutralization then effected. This and subsequent evaporations herein referred to are performed in tanks or kettles provided with suitable steam-jackets or steam-coils, ordinary high-pressure or superheated steam being applied as the heating agent. A slight excess of the above acid is used, so as to cause the separation of the fatty acids, resins, and dissolved soapy matters contained in the waste lye. The liquor is then strained, and the excess of the free acid neutralized by the addition of alumina hydrate in proportions sufficient to unite with the excess of sulphuric acid and the sulphate of soda present to form soda-alum. I sometimes prefer at this stage of the operation to also add a solution of sulphate of iron, so as to determine the formation of soda-iron alum—a comparatively insoluble compound. The production of either of the above alums materially assists in the coagulation of the gelatinous and other organic impurities present in the waste soap-lye and in the clarification of the same. I may also use any economical alkaline earth or salt for the neutralization of the excess of free acid. The liquor is now subjected to further concentration until it has been reduced to, say, one-eighth ($\frac{1}{8}$) of its original bulk, the separated salts being removed by straining or other suitable device. I then add to the thick sirupy mass (which consists essentially of a mixture of glycerine, chloride and sulphate of soda, and small amounts of other salts) a solution of oxalate of ammonia or oxalic acid in methylic alcohol, or in other alcohol. I may prefer to first dissolve the impure glycerine in methylic or other alcohol, and afterward add to the solution oxalate of ammonia or oxalic acid; or I may first add oxalate of ammonia or oxalic acid to the glycerine, and then add methylic or other alcohol to the mixture.

In some cases I have found by experiments that a concentrated aqueous solution of oxalate of ammonia can replace the use of an alcoholic solution of the salt, and I may therefore employ this reagent under certain circumstances.

It is difficult to definitely state the exact proportion of the above-mentioned reagents necessary to be employed, as this depends upon the amount of soda salts remaining dissolved in the concentrated liquor operated upon, which should be determined by preliminary experiments or chemical analysis. I may sometimes prefer to omit the preliminary treatment of the waste lye with sulphuric acid and the subsequent neutralization with alumina, hydrate, &c. In this case the lye is directly evaporated to, say, one-tenth of its original bulk. It is then allowed to cool, and is strained, and about an equal quantity of methylic or other alcohol added to the glycerinous mass. Carbonic-acid gas is now conducted into the mixture until the caustic soda and carbonate of soda present are converted into bicarbonate of soda, which salt is insoluble in methylic alcohol. The liquor is then strained, and the soda salts still remaining dissolved therein can be removed by treating the alcoholic glycerinous solution with oxalate of ammonia or with oxalic acid, substantially in the manner hereinabove described. Whichever method I employ I next pass the liquor through a filtering apparatus, consisting of successive layers of felt, clay, silica, and animal or wood charcoal, by means of which all precipitated salts are retained, as well as certain dissolved saline and coloring impurities removed. The resulting fluid is then placed in a still, and the methylic alcohol contained therein removed by distillation and preserved for future use. The concentrated glycerine remaining in the still may now be transferred to an evaporating-kettle, and, with or without the application of external heat, hot dry air or superheated steam is injected through the same in fine jets by means of suitable pipes. Through this treatment the elimination of the volatile matters possibly remaining dissolved in the glycerine is effected.

The result of the preceding series of operations is glycerine practically free from saline impurities and adapted for use in the manufacturing arts, as by products of my process large quantities of chloride of sodium, sulphate of soda, oxalate of soda, bicarbonate of soda, and alum are produced, some of which can be employed for the separation of soap from the soap-maker's lye-kettles, while the remainder can be otherwise utilized.

In order to obtain the glycerine made by the foregoing processes in an absolutely pure condition, it is only necessary to submit it to a final distillation by means of superheated steam, as is now practiced by glycerine-refiners.

While I am aware that impure glycerine has already been made from soap-makers' waste liquor by various methods, and that the processes of neutralization of this waste lye with certain acids, and subsequent evaporation, straining, &c., have been resorted to, and while I am also acquainted with the previous use of oxalic acid in combination with acetate of lead in this connection, I am unacquainted with any process which unites the essential features embodied in the foregoing specification, and which actually results in the removal of the chloride of sodium and other saline ingredients contained in the waste soap-lye.

The application of oxalic acid to the waste lye for the formation of oxalate of soda hitherto practiced can only effect a partial precipitation of the soda contained in the liquor treated, since oxalate of soda is not insoluble in a mixture of glycerine and water. The addition at this stage of the operation of methylic or other alcohol results, however, in an almost complete separation of the soda salts present.

I also desire to state that I am aware that the method of conducting carbonic-acid gas into the waste lye for the purpose of forming bicarbonate of soda has previously been employed. The solubility of this salt in the glycerinous mixture militates against the practical value of this process, which can be made of real service only by the addition of methylic or other alcohol in connection with the treatment by carbonic-acid gas.

I claim to have invented a more economical and effectual method for producing practically pure glycerine from waste soap-liquor than has hitherto been discovered.

Having fully described my invention, what I desire to claim as new, and secure by Letters Patent, is—

1. In the manufacture of glycerine from waste soap-lye, the combination of the processes of neutralization of the free acid remaining after the treatment of the liquor with sulphuric acid by alumina hydrate, with or without sulphate of iron, with the other methods of operation, substantially as set forth.

2. In the manufacture of glycerine from waste soap-lye, the combination of the processes of precipitation of the soda by means of solution of oxalic acid or oxalate of ammonia in methylic or other alcohol with the other methods of operation, substantially as set forth.

3. In the manufacture of glycerine from waste soap-lye, the combination of the processes of precipitating the soda salts by means of first dissolving the concentrated glycerinous mass in methylic or other alcohol, and then adding oxalate of ammonia or oxalic acid to the solution, with the other methods of operation, substantially as set forth.

4. In the manufacture of glycerine from waste soap-lye, the combination of the processes of precipitating the soda salts by first adding oxalate of ammonia or oxalic acid to the concentrated glycerinous mass, and then adding methylic or other alcohol to the mixture, with the other methods of operation, substantially as set forth.

5. In the manufacture of glycerine from waste soap-lye, the combination of the application of an aqueous solution of oxalate of ammonia with the other methods of operation, substantially as set forth.

6. In the manufacture of glycerine from waste soap-lye, the combination of the processes of evaporation, straining, and treatment of the glycerinous mass conjointly with methylic or other alcohol and carbonic-acid gas, with the other methods of operation, substantially as set forth.

7. In the manufacture of glycerine from waste soap-lye, the combination of the processes of evaporation, straining, and treatment of the glycerinous mass first conjointly with methylic or other alcohol and carbonic-acid gas, and subsequently adding to the alcoholic solution oxalate of ammonia or oxalic acid, with the other methods of operation, substantially as set forth.

JESSE PARK BATTERSHALL.

Witnesses:
EDWARD SHERER,
ERNEST J. CHAPMAN.